United States Patent [19]
Johnson et al.

[11] 3,770,004
[45] Nov. 6, 1973

[54] MIXING VALVE ASSEMBLY
[75] Inventors: Tom W. Johnson; Joe L. Johnson, both of Burton, Ohio
[73] Assignee: Sajar Plastics, Inc., Middlefield, Ohio
[22] Filed: Mar. 12, 1972
[21] Appl. No.: 234,073

Related U.S. Application Data
[63] Continuation of Ser. No. 101,810, Dec. 28, 1970, abandoned.

[52] U.S. Cl................ 137/315, 137/606, 285/24, 285/423
[51] Int. Cl............................................. F16k 19/00
[58] Field of Search ............... 137/315, 606; 4/192; 285/24, 27, 423

[56] References Cited
UNITED STATES PATENTS
3,229,710  1/1966  Keller ........................... 137/606 X
3,387,309  6/1968  Johnson ......................... 137/606 X
3,394,954  7/1968  Sarns ............................. 285/423 X
3,117,587  1/1964  Willinger ....................... 137/315
3,369,828  2/1968  Trickey .......................... 285/423 X
3,598,430  8/1971  Maher et al. ................... 285/24

Primary Examiner—Robert G. Nilson
Attorney—Watts et al.

[57] ABSTRACT

A mixing valve assembly constructed of plastic parts in which end pieces that form valve bodies receive the ends of conduits of a mixing chamber. Ends of the conduits are received in recesses of the end pieces, are secured by an adhesive or solvent, oriented by mating noncircular portions, and sealed by both the adhesive or solvent and an O-ring between each conduit and the connected end piece.

6 Claims, 3 Drawing Figures

PATENTED NOV 6 1973    3,770,004

INVENTORS.
TOM W. JOHNSON
JOE L. JOHNSON
BY Watts, Hoffmann,
Fisher & Heinke
ATTORNEYS

MIXING VALVE ASSEMBLY

This is a continuation of application Ser. No. 101,810, filed Dec. 28, 1970, now abandoned.

BACKGROUND OF THE INVENTION

1. Field of the Invention

This invention relates to valve assemblies and more particularly to a plastic underbody mixing valve assembly.

2. Prior Art

Mixing valve underbodies, that is, valves and conduits that form the plumbing part of faucet fixtures, are typically made of metal, such as brass. Such underbodies are usually in part located beneath a sink flange or the like, and extending parts are covered with decorative casings or hoods. With the advent of plastic materials and injection molding techniques, there has been some general recognition of the desirability of utilizing the lighter, less expensive, plastic materials in various plumbing applications. The inertness of plastic materials and the ability to injection mold such materials to close tolerances, which eliminates many subsequent fabricating steps, such as threading and machining, have made their use particularly attractive. Nevertheless, certain problems exist in providing suitable plastic fixtures, due to limitations on the shapes that can be injection molded and for the need in providing suitable connections between separate parts of assemblies, especially where parts are not threaded together. Two approaches to fabricating plastic valve assemblies are shown in U. S. Pats. Nos. 3,229,710 and 3,448,768.

SUMMARY OF THE INVENTION

The present invention is directed to a new and improved plastic valve assembly, and more particularly to a plastic underbody mixing valve assembly, adapted for injection molding, that can be supplied in kit form for home assembly, and in which ease of assembly is provided and a water-tight seal between assembled parts assured, by the use of both an O-ring seal and an adhesive or solvent bonding of parts, at the junctures of parts forming the assembly. The use of an O-ring assures that any loss in the integrity of the bond formed by the adhesive or solvent, due, for example, to aging, heat, mechanical stresses, or the like, will not result in leakage, as long as the parts remain assembled.

Adhesive or solvent bonding of the assembled parts has substantial advantages over spin welding of plastic parts in this application, since it permits on-site assembly and the selection and use of interchangeable parts, for example, different valve bodies or a mixing chamber with shorter conduits to space the valves a different distance apart for a particular installation.

An especially good seal and strong bond are provided, and a positive orientation of the assembled parts in proper relationship is obtained, by providing a recess in each end piece that forms a valve member of a mixing valve assembly, which recess receives an end of a conduit from a mixing chamber of the assembly. Each recess is in part cylindrical and in part noncylindrical. The end of each conduit receivable in the recesses is similarly shaped for a close, mating, fit. The noncircular parts orient the end pieces, which in the preferred construction are identically constructed, so that the parts cannot be assembled improperly. The cylindrical portions of each recess and conduit end facilitate an O-ring seal, which assures a water-tight connection that is independent of the adhesive or solvent bond. In the preferred construction, the solvent or adhesive bond is restricted to the noncylindrical mating portions of the parts.

From the foregoing, it will be appreciated that a principal object of this invention is the provision of a plastic valve assembly in which parts can be injection molded, can be conveniently and easily assembled, and connected securely and tightly to provide a reliable, water-tight, seal. This and other objects, features and advantages of this invention will become more apparent from the detailed description that follows, when considered in connection with the accompanying drawings.

DETAILED DESCRIPTION OF A PREFERRED EMBODIMENT

Figure 1:
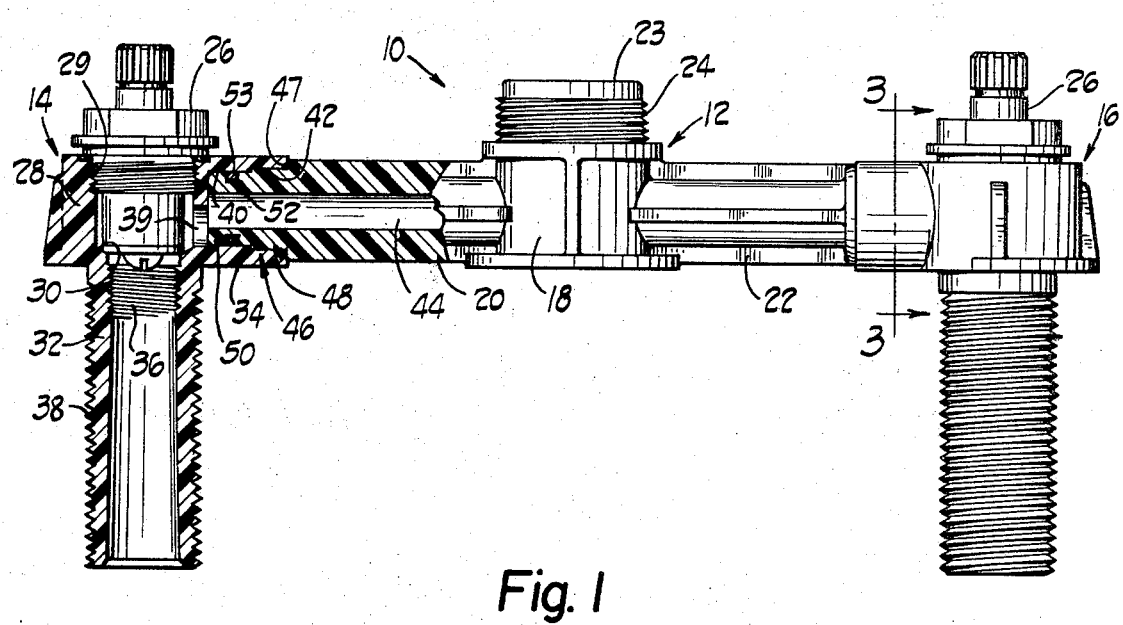
FIG. 1 is a front elevational view with parts in section of an embodiment of the present invention.
Figure 2:
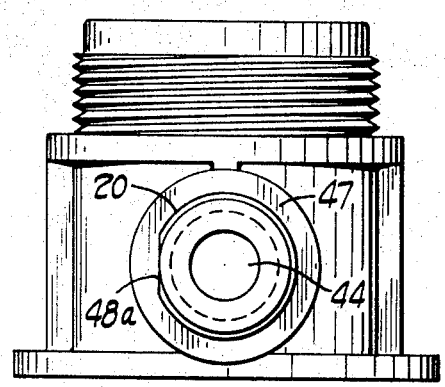
FIG. 2 is an end elevational view of the center piece of the embodiment shown in FIG. 1, as viewed from the left-hand side.
Figure 3:
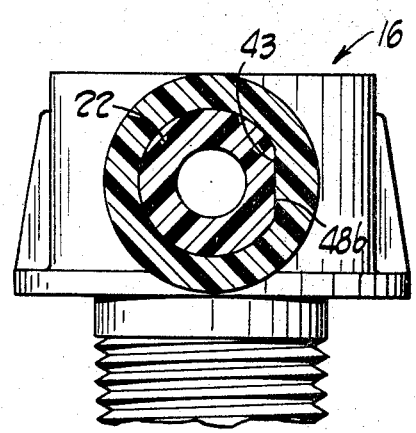
FIG. 3 is a transverse sectional view taken along the line 3—3 in FIG. 1.

A mixing valve underbody 10 embodying the present invention is shown in FIGS. 1 to 3 of the drawings. The underbody 10 forms a faucet fixture for sinks or the like to control and mix flows of hot and cold water. The preferred embodiment is formed of three pieces, a center piece 12 and two identical end pieces 14, 16. The three pieces are injection molded of suitable plastic material, such as ARLON T, which is a polyarylether manufactured and sold by Uniroyal Company and having properties that will withstand relatively high temperatures on the order of 300° F. without distortion which can be suitably constructed for present purposes for use with fluid pressures as high as 260 pounds per square inch.

The center piece 12 includes a mixing chamber 18 and two integral conduit portions 20, 22 that communicate therewith. The mixing chamber 18 has an outlet 23 adapted to receive a spout (not shown) for swiveling movement. External threads 24 about the outlet 23 receive a threaded spout retainer. The conduit portions 20, 22 are tubular, extend from the mixing chamber in opposite directions from each other in the embodiment shown, and are constructed to communicate with and be connected to the two end pieces 14, 16.

Both of the end pieces 14, 16 are identical and each receives an end of one of the conduit portions 20, 22 and forms a valve body adapted to be coupled to a water line. Each valve body receives a valve unit 26 for controlling the flow of liquid through the end piece. Since the pieces 14, 16 are identical, only the end piece 14 will be described in detail.

As best shown in FIG. 1, the end piece 14 has a valve body portion 28 that is cylindrical in configuration, with internal threads 29 at one end (the upper end in the orientation shown), which threadedly receive the valve unit 26. An annular valve seat 30 is formed at the opposite end of the valve body from the internal threads 29.

An axially aligned pipe portion 32 and a transverse pipe portion 34 extend from the valve body portion 28 of the end piece 14. The axially aligned pipe portion 32 includes internal threads 36 for receiving, if desired, an adaptor having a modified valve seat, and external threads 38 for coupling the end body to a water line. The transverse pipe portion 34 is constructed to receive the end of the conduit portion 20 of the center piece and both pipe portions 32 and 34 provide communication to the valve body portion 28 on opposite sides of the valve seat. The transverse pipe portion 34 communicates to the valve body through an orifice 39 of smaller cross sectional area than the pipe portion proper and located axially off-center therefrom, as shown in FIG. 1, to provide sufficient axial depth for the internal threads 29 at the one end of the valve body portion.

To facilitate the use of the end pieces 14, 16 with underbodies of various valve spacings, the transverse pipe portion 34 is of minimum length, substantially shorter than the conduit portion 20 in the depicted embodiment, which will vary in length depending upon the valve spacing desired. The short pipe portion 34 forms a recess or receptacle and has a stepped, smooth, internal surface that receives the end of the conduit portion 20. The stepped internal surface comprises a cylindrical part 40 adjacent the orifice 39 and a noncylindrical part 42 axially outward from the cylindrical inner part 40. In the preferred embodiment, the noncylindrical part 42 is cylindrical except for a flat portion, which is located on one side, as shown at 43 in FIG. 3 in connection with the identical end piece 16.

The conduit 20 of the center piece 12 and associated with the end piece 14 has a central passageway 44 that extends the length of the conduit and opens into the mixing chamber 18. The distal end of the conduit portion terminates in a nipple 46 of reduced diameter, that extends from a radial shoulder 47. A portion 48 of the nipple 46 adjacent the shoulder 47 is noncylindrical in external contour and is shaped of a mating configuration with the axially outer part 42 of the transverse pipe portion 34. That is, it is cylindrical except for a flat portion 48a on one side (the side facing rearwardly in the orientation of FIG. 1). See FIG. 2. The corresponding flat portion 48b of the conduit 22 is oppositely disposed, as shown in FIG. 3, opposite the flat portion 43. This permits the use of identical end pieces and assures that they cannot be improperly oriented. The noncylindrical portion 48 is of an axial length equal to that of the recess portion 42 and of a very slightly smaller outside diameter, so as to be receivable therein with a close fit. A terminal portion 50 of the nipple 46 is cylindrical in external configuration and of smaller diameter than the noncylindrical portion 48. The outside diameter is slightly smaller than the inside diameter of the recess portion 40 to provide a close circumferential fit. The axial length of the terminal portion 50 corresponds to that of the cylindrical, axially inner, part 40 of the transverse pipe portion 34. An annular groove 52 is formed in the cylindrical terminal portion 50 and receives an elastomeric O-ring 53.

The center piece 12 and two end pieces 14, 16 are assembled and secured together by inserting the portions 46 into the transverse pipe portions 34. In assembled condition, as shown in FIG. 1, the radial shoulders 47 will abut the ends of the transverse pipe portions 34 and the O-rings 53 will engage the internal cylindrical surface of the inner part 40 of each recess formed by the transverse pipe portions. With this relationship, the O-rings 53 will form a water-tight seal between each end piece and the associated conduit portion of the center piece and prevent the leakage of fluid between the pieces, when subjected to the typical water pressures of plumbing systems in which such underbodies are used. The larger portion 48 adjacent the shoulder 47 and received in the noncylindrical part 42 of the transverse pipe portion is bonded to the transverse pipe portion by an adhesive or solvent, which is preferably limited in its location essentially to the noncylindrical portion of the nipple and its mating part of the respective transverse conduit portion 20, 22. The adhesive or solvent provides a localized bond that secures each end piece to the associated conduit portion and that acts as a further seal to the O-ring, to provide a double seal against leakage.

By virtue of the above described construction, a multi-piece plastic underbody is provided that can be injection molded, is easily and quickly assembled, and in which the pieces at opposite ends of a center piece are identical in shape and constructed to assure proper orientation upon assembly. The construction provides and assures a water-tight connection and seal between the parts, that is not totally dependent upon an adhesive or solvent bond, and which therefore does not loose effectiveness from aging and strain from mechanical and thermal stresses. With the O-ring seal, close tolerances of the mating parts need not be established or held in order to assure a fluid-tight connection and the mating parts need not be tapered in order to provide a tight seal. As a result, the nipple 46 can always be totally received within the transverse pipe portion 34, with the radial shoulder 47 abutting the end of the pipe portion, assuring a pleasing and finished appearance. Because of the ease of assembly, the unit is particularly adapted for home use and sale in kit form, in which case the ability to form a water-tight seal, notwithstanding an imperfect solvent or adhesive bond between the parts, is extremely important.

While a preferred embodiment of the present invention has been described in detail, it will be appreciated that various modifications or alterations can be made therein, without departing from the spirit and scope of the invention set forth in the appended claims.

What is claimed is:

1. A valve assembly comprising a plastic centerpiece that forms a mixing chamber; two plastic conduits that extend from the centerpiece in communication with said mixing chamber; and two plastic end pieces each adapted to form a valve structure, each with a recess for receiving an extending end of one of said two conduits, at least a first portion of said recess being cylindrical and a second portion being noncylindrical; the extending end of each of said conduits having a cylindrical portion adapted to be received in the cylindrical portion of the recess of one of said end pieces and a noncylindrical portion adapted to be received in said second portion, to be bonded thereto and to align the end piece in a predetermined orientation relative to the conduit received therein; and an annular groove in said cylindrical portion of one of each mating conduit and end piece adapted to receive an O-ring.

2. A valve assembly as defined in claim 1 wherein said annular groove is located in said cylindrical portion of each conduit.

3. A valve assembly as defined in claim 2 wherein said noncylindrical portions at the extending ends of said conduits are cylindrical except for a flat portion and the flat portion of each faces in an opposite direction from the other.

4. An underbody mixing valve assembly comprising a plastic mixing chamber having a central portion with a cavity and conduit portion extending therefrom in opposite directions, and two identically constructed plastic end pieces adhered, one to each of said conduit portions, with an adhesive or solvent bond; each of said end pieces having a central passageway and a transverse passageway in communication therewith, a stepped recess forming a part of said transverse passageway and having a cylindrical part and a noncylindrical part axially outward of said cylindrical part; each outer end of said conduit portions having a radial shoulder and a nipple extending therebeyond, said radial shoulder abutting an end surface of the connected end piece and said nipple being received in said stepped recess with a close fit, the outer end portion of said nipple being cylindrical and containing an annular groove and the portion of said nipple adjacent said radial shoulder having a noncylindrical contour that mates with said noncylindrical part of said recess; an O-ring in the annular groove of each nipple; and an adhesive bond between each nipple and the receiving recess of the connected end piece along said mating noncylindrical portions.

5. A valve assembly comprising a plastic centerpiece that forms a mixing chamber and two plastic end pieces each adapted to form a valve structure, said centerpiece and end pieces having interconnected conduit portions, the interconnections therebetween being provided by mating portions of the conduits including a recess forming a part of one conduit portion and an end of the connected conduit portion that is received therein in mating relationship, said mating conduit portions each including a surface that interengages with that of the other to prevent mating of the conduit portions unless they are in predetermined alignment and that prevents relative rotation of the conduit portions after they are in mating relationship, an annular groove in one mating conduit portion of each interconnection, an O-ring in each said annular groove, and means bonding said mating conduit portions together.

6. A mixing valve assembly comprising a plastic mixing chamber having a central portion with a cavity and conduit portions extending therefrom in opposite directions, and two identically constructed plastic end pieces adapted to form valve structure attached one to the end of each conduit portion, each of said end pieces having a central passageway and a transverse passageway in communication therewith, a recess in one of said transverse passageway and attached conduit portion and a nipple at the end of the other, said recess having a portion formed by a surface of revolution and a portion axially displaced therefrom formed by a surface of nonrevolution and said nipple being shaped to be received in said recess with a close fit, one portion of said nipple being formed of a surface of revolution and another portion having a surface of nonrevolution, an annular groove in the surface of revolution of one of said recess and nipple, an O-ring in said annular groove, and means bonding the end pieces to the conduit portions of said mixing chamber.

* * * * *